US009120650B2

(12) United States Patent
Langer et al.

(10) Patent No.: US 9,120,650 B2
(45) Date of Patent: Sep. 1, 2015

(54) CRANE CONTROLLER WITH CABLE FORCE MODE

(71) Applicant: Liebherr-Werk Nenzing GmbH, Nenzing (AT)

(72) Inventors: Karl Langer, Bludenz (AT); Klaus Schneider, Hergatz (DE); Sebastian Kuechler, Boeblingen (DE); Oliver Sawodny, Stuttgart (DE)

(73) Assignee: Liebherr-Werk Nenzing GmbH, Nenzing (AT)

( * ) Notice: Subject to any disclaimer, the term of this patent is extended or adjusted under 35 U.S.C. 154(b) by 153 days.

(21) Appl. No.: 13/788,851

(22) Filed: Mar. 7, 2013

(65) Prior Publication Data

US 2013/0245816 A1 Sep. 19, 2013

(30) Foreign Application Priority Data

Mar. 9, 2012 (DE) ......................... 10 2012 004 914

(51) Int. Cl.

| | |
|---|---|
| ***G06F 7/70*** | (2006.01) |
| ***G06F 19/00*** | (2011.01) |
| ***B66C 13/18*** | (2006.01) |
| ***B66C 13/02*** | (2006.01) |
| ***B66D 1/52*** | (2006.01) |
| ***B66C 13/04*** | (2006.01) |
| ***B66C 13/06*** | (2006.01) |

(52) U.S. Cl.

CPC ................. *B66C 13/18* (2013.01); *B66C 13/02* (2013.01); *B66C 13/04* (2013.01); *B66C 13/063* (2013.01); *B66D 1/525* (2013.01)

(58) Field of Classification Search

None

See application file for complete search history.

(56) References Cited

U.S. PATENT DOCUMENTS

| | | | | |
|---|---|---|---|---|
| 5,728,953 | A * | 3/1998 | Beus et al. | 73/862.472 |
| 5,785,191 | A * | 7/1998 | Feddema et al. | 212/275 |
| 6,102,221 | A * | 8/2000 | Habisohn | 212/270 |
| 6,496,765 | B1 * | 12/2002 | Robinett et al. | 701/50 |
| 7,234,684 | B2 * | 6/2007 | Kohlenberg et al. | 254/274 |
| 7,426,423 | B2 * | 9/2008 | Schneider et al. | 700/213 |
| 7,599,762 | B2 * | 10/2009 | Discenzo et al. | 701/1 |
| 8,025,167 | B2 * | 9/2011 | Schneider et al. | 212/273 |
| 2007/0050115 | A1 * | 3/2007 | Discenzo et al. | 701/50 |

FOREIGN PATENT DOCUMENTS

| | | | |
|---|---|---|---|
| DE | 3643114 | A1 | 8/1987 |
| DE | 19645812 | C1 | 2/1998 |
| DE | 102008024513 | A1 | 11/2009 |
| DE | 102009032269 | A1 | 1/2011 |

(Continued)

OTHER PUBLICATIONS

Schneider, K. et al., "Crane Controller with Division of a Kinematically Constrained Quantity of the Hoisting Gear", U.S. Appl. No. 13/788,828, 43 pages.

(Continued)

*Primary Examiner* — Bhavesh V Amin

(74) *Attorney, Agent, or Firm* — Alleman Hall McCoy Russell & Tuttle LLP

(57) ABSTRACT

The present disclosure shows a crane controller for a crane which includes a hoisting gear for lifting a load hanging on a cable, wherein the crane controller has a cable force mode in which the crane controller actuates the hoisting gear such that a setpoint of the cable force is obtained.

13 Claims, 7 Drawing Sheets

(56) References Cited

FOREIGN PATENT DOCUMENTS

| | | | |
|---|---|---|---|
| EP | 0176832 | A1 | 4/1986 |
| WO | 0227684 | A1 | 4/2002 |

OTHER PUBLICATIONS

Schneider, K. et al., “Crane Controller with Drive Constraint”, U.S. Appl. No. 13/788,856, 42 pages.

* cited by examiner

CRANE CONTROLLER WITH CABLE FORCE MODE

CROSS REFERENCE TO RELATED APPLICATION

This application claims priority to German Patent Application No. 10 2012 004 914.5, entitled "Crane Controller with Cable Force Mode," filed Mar. 9, 2012, which is hereby incorporated by reference in its entirety for all purposes.

TECHNICAL FIELD

The present disclosure relates to a crane controller for a crane which includes a hoisting gear for lifting a load hanging on a cable.

BACKGROUND AND SUMMARY

In known crane controllers a control or regulation usually is employed, in which the desired position or velocity of the load serves as setpoint. For example, the crane operator specifies a desired velocity of the load via a hand lever, which then serves as input variable for the crane controller.

The inventors of the present disclosure have recognized that such actuation of the hoisting gear can be disadvantageous in certain constellations.

Therefore, it is the object of the present disclosure to provide an improved crane controller.

In accordance with the present disclosure, this object is solved by a crane controller for a crane which includes a hoisting gear for lifting a load hanging on a cable. According to the present disclosure, the crane controller has a cable force mode in which the crane controller actuates the hoisting gear such that a setpoint of the cable force is obtained. Such actuation of the hoisting gear on the basis of the desired force which acts in the cable can have advantages for certain hoisting situations as compared to a crane controller which operates with reference to a target position or target velocity of the load. In particular, the generation of a slack cable when setting down the load can be prevented by the cable force mode of the crane controller according to the present disclosure. Advantageously, the actuation is effected automatically.

In one example, the velocity and/or position of the winch is actuated. In particular, the velocity and/or position of the winch can be actuated by taking account of the elasticity of the system such that the setpoint of the cable force is obtained.

Advantageously, in the cable force mode the cable force can be maintained at a constant setpoint. Advantageously, in the cable force mode the crane controller actuates the hoisting gear such that the cable force is automatically adjusted to a specified setpoint.

There can be provided a cable force determination unit which determines an actual value of the cable force. Advantageously, the actuation then is effected on the basis of a comparison of the actual value and the setpoint value of the cable force.

According to the present disclosure, in the cable force mode the cable force can be controlled by feedback of at least one measured value. Advantageously, the cable force determination unit determines the actual value of the cable force on the basis of a measurement signal of a cable force sensor.

According to the present disclosure, the cable force sensor can be arranged at the hoisting gear, in particular at a mount of the hoisting winch and/or a mount of a cable pulley. For example, the cable force sensor can be arranged in a tab which fixes the hoisting winch on a hoisting winch base, or which holds a cable pulley through which the hoisting cable is guided.

Furthermore, the cable force determination unit can determine the actual value of the cable force via a filtration of measured values or a model-based estimation. In particular, an observer can be provided, which determines the cable force on the basis of measured values as well as a physical model of the dynamics of the cable.

Furthermore, the crane controller according to the present disclosure can include a setpoint determination unit which determines the setpoint of the cable force with reference to measured values and/or control signals and/or inputs of a user.

For example, the setpoint determination unit can determine the static force acting on the cable during a lift. In particular, the static force acting on the cable can be determined during a lifting operation preceding the cable force mode. The static force in particular corresponds to the weight of the lifted load. The dynamic part of the forces acting in the cable can be removed for example by filtration.

Furthermore, the cable length can be included in the setpoint determination unit in accordance with the present disclosure. Especially during lifts with great cable length, the load acting at the cable suspension point also depends on the length of the unwound cable and its weight, respectively. Advantageously, the setpoint determination unit therefore takes account of the weight of the unwound cable.

In particular, the weight of the lifted load can be determined in that with a free-hanging load the weight of the unwound cable is deducted from a static part of a measured force. Advantageously, the setpoint determination unit then takes account of the weight of the lifted load thus determined and the weight of the cable currently unwound in the cable force mode.

A setpoint determination unit which takes account of the cable length in particular is advantageous when the cable force is measured via a sensor which is arranged not on the load hook, but for example on the hoisting gear.

Furthermore, a crane controller according to the present disclosure can comprise an input element via which the crane operator can vary the setpoint of the cable force. The crane operator thereby can set which tension is to be maintained in the cable during the cable force mode.

Advantageously, a corresponding factor can be entered, which determines the ratio between the setpoint of the cable force and the static force during a lift. For example, the crane operator thus can specify that during the cable force mode at least a part of the cable force should be in a certain ratio to the weight force of the load previously acting on the cable.

Advantageously, the setpoint of the cable force is determined such that it always lies above the weight force generated by the unwound load cable. It thereby is ensured that no slack cable can be obtained in the cable force mode. As already described above, the cable length advantageously is taken into account for this purpose and the weight of the unwound cable is determined. In particular, the setpoint of the cable force can consist of the sum of the weight force generated by the unwound load cable and a force which is in a particular ratio to the weight force of the load previously acting on the cable.

In the cable force mode, the crane controller according to the present disclosure can comprise a pilot control part, which takes account of the dynamics of the cable, and a feedback part, via which the cable force determined by the cable force determination unit is fed back. For example, the pilot control part can be based on the inversion of a model describing the vibration dynamics of the cable. Advantageously, the same takes account of the weight of the unwound cable. The actuation then is stabilized via the feedback part.

Furthermore, the crane controller according to the present disclosure can include a state detection, wherein the crane controller automatically switches into and/or out of the cable force mode with reference to the state detection. Advantageously, the state detection can detect setting down and/or picking up of the load. The crane controller thereby can automatically switch into or out of the cable force mode, when it recognizes such setting down or picking up of the load.

Alternatively, switching in one or in both directions also can be effected manually by the crane operator.

Advantageously, the state recognition each can indicate the current state.

Advantageously, the state detection monitors the cable force, in order to detect the state of the crane and in particular to detect setting down and/or picking up of the load. Advantageously, setting down of the load is recognized when a negative load change exists and/or when the derivative of the cable force lies below a certain threshold value, whereas the crane operator specifies lowering of the load via an input device, such as a joystick or a touch screen. Conversely, picking up of the load can be recognized when a positive load change exists and/or when the derivative of the cable force lies above a certain threshold value, whereas the crane operator specifies lifting of the load via an input device.

The crane controller according to the present disclosure furthermore can comprising a lifting mode, in which the hoisting gear is actuated on the basis of a setpoint of the load state or cable state, such as the load position and/or the load velocity and/or on the basis of a setpoint of the cable position and/or cable velocity. There can be provided a controller which in the lifting mode feeds back an actual value of the load position and/or load velocity and/or cable position and/or cable velocity.

Advantageously, the crane controller switches from the lifting mode into the cable force mode, when it detects setting down of the load.

Furthermore, the crane controller or the crane operator can switch from the cable force mode into the lifting mode, when the crane controller detects and possibly indicates picking up of the load.

The crane controller according to the present disclosure particularly can be used during lifts in which either the cable suspension point or the load deposition point moves, as is the case due to the heave for example in cranes arranged on a ship or with loads to be deposited on a ship.

Due to the cable force mode according to the present disclosure, the occurrence of a slack cable can be prevented despite a movement of the cable suspension point or the load deposition point, since a constant tension is maintained in the cable via the cable force mode. The partly enormous loads acting on the cable and on the crane, which can be generated in slack-cable situations, thereby are avoided.

The crane controller according to the present disclosure can include an active heave compensation which by actuating the hoisting gear at least partly compensates the movement of the cable suspension point and/or a load deposition point due to the heave. An even further improved actuation of the crane thereby can be achieved during heave.

Advantageously, the active heave compensation is effected on the basis of a prediction which predicts the future movement of the cable suspension point or load deposition point due to the heave and at least partly compensates the same by a corresponding actuation of the hoisting gear.

The active heave compensation can be employed in the lifting mode and/or in the cable force mode of the crane controller according to the present disclosure.

The present disclosure furthermore comprises a crane with a crane controller as it has been described above.

In particular, the crane according to the present disclosure can be a deck crane. A deck crane is a crane which is arranged on a pontoon. In such cranes, the cable suspension point therefore can move due to the heave.

Alternatively, the crane according to the present disclosure for example also can be a harbor crane or offshore crane or cable excavator, in particular a mobile harbor crane. A harbor crane is used to load loads onto a ship or unload the same from a ship. A crane according to the present disclosure therefore can also be installed on a drilling platform. In such cranes which are used for loading or unloading a ship, the load deposition point can move due to the heave.

The present disclosure furthermore comprises the use of a crane controller according to the present disclosure in lifting situations in which the cable suspension point and/or the load deposition point moves due to external influences such as for example due to the heave. External influences, however, also may be wind loads which move the cable suspension point.

Here, the cable force mode according to the present disclosure can prevent that a slack cable is obtained due to this external movement. The cable suspension point in particular can be the crane tip, from which the hoisting cable is guided to the load. When the same is moved for example due to the heave, this movement is transmitted to the cable and hence to the load. The load deposition point for example can be the loading area of a pontoon, in particular of a ship. When the same is moving with the load set down, either a slack cable can be obtained or the load can be lifted.

The present disclosure furthermore comprises the use of a crane controller according to the present disclosure with the load set down. In particular, the cable force mode according to the present disclosure automatically ensures that a desired setpoint of the cable force is maintained. Advantageously, this is effected by a control of the cable force according to the present disclosure.

The present disclosure furthermore comprises a method for actuating a crane which includes a hoisting gear for lifting a load hanging on a cable. According to the present disclosure, the hoisting gear is actuated on the basis of a setpoint of the cable force. This also provides the advantages which have already been set forth above in detail with regard to the crane controller and its use.

Advantageously, the method is effected such as has already been described above in detail with regard to the crane controller according to the present disclosure and its use.

In particular, the method according to the present disclosure can be carried out with a crane controller as it has been described above.

Advantageously, the crane controller according to the present disclosure automatically switches into the cable force mode upon detection of a depositing operation. Advantageously, a ramp-shaped transition is effected from the force currently measured on detection of the depositing operation to the actual target force, in order to avoid setpoint jumps in the reference variable.

Furthermore, for lifting the load the target force initially can be raised to such an extent that the load is lifted. Furthermore advantageously, switching from the target force mode to the lifting mode is carried out with free-hanging load.

Advantageously, the crane operator can manually switch from the cable force mode into a lifting mode. Alternatively, this is effected automatically by the crane controller.

Furthermore advantageously, the input device via which the crane operator specifies the movement of the load in the lifting mode also is deactivated automatically during the cable force mode.

The present disclosure furthermore comprises software with code for carrying out a method as it has been described above. The software can be stored on a machine-readable data storage medium. Advantageously, a crane controller according to the present disclosure can be implemented by the software according to the present disclosure, when it is installed on a crane controller.

The crane controller according to the present disclosure and in particular the cable force mode advantageously is realized by an electronic control unit. In particular, a control computer can be provided, which is connected with input elements and/or sensors and generates actuation signals for actuating the hoisting gear. The control computer furthermore can be connected with a display device, which visually displays information on the state of the crane controller to the crane operator. Advantageously, it is indicated according to the present disclosure whether the crane controller is in the cable force mode and/or in the lifting mode. Furthermore, the setpoint can be visualized according to the present disclosure. Advantageously, the control computer is connected with an input element via which the desired cable force can be set. Furthermore advantageously, the control computer is connected with a cable force sensor.

The present disclosure will now be explained in detail with reference to an exemplary embodiment and drawings.

DETAILED DESCRIPTION

Figure 0:
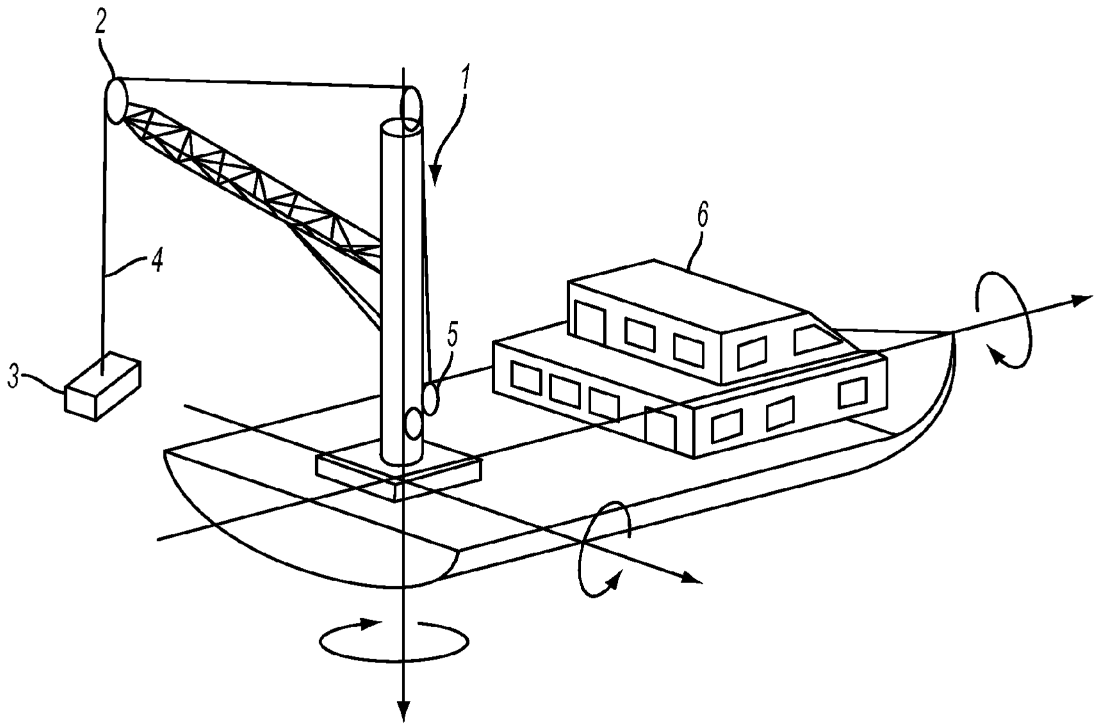
FIG. 0 shows a crane according to the present disclosure arranged on a pontoon.

FIG. 0 shows an exemplary embodiment of a crane 1 with a crane controller according to the present disclosure for actuating the hoisting gear 5. The hoisting gear 5 includes a hoisting winch which moves the cable 4. The cable 4 is guided over a cable suspension point 2, in the exemplary embodiment a deflection pulley at the end of the crane boom, at the crane. By moving the cable 4, a load 3 hanging on the cable can be lifted or lowered.

There can be provided at least one sensor which measures the position and/or velocity of the hoisting gear and transmits corresponding signals to the crane controller.

Furthermore, at least one sensor can be provided, which measures the cable force and transmits corresponding signals to the crane controller. The sensor can be arranged in the region of the crane body, in particular in a mount of the winch 5 and/or in a mount of the cable pulley 2.

In the exemplary embodiment, the crane 1 is arranged on a pontoon 6, here a ship. As is likewise shown in FIG. 0, the pontoon 6 moves about its six degrees of freedom due to the heave. The crane 1 arranged on the pontoon 6 as well as the cable suspension point 2 also are moved thereby.

The crane controller according to the present disclosure can include an active heave compensation which by actuating the hoisting gear at least partly compensates the movement of the cable suspension point 2 due to the heave. In particular, the vertical movement of the cable suspension point due to the heave is at least partly compensated.

The crane controller may be a microcomputer including: a microprocessor unit, input/output ports, read-only memory, random access memory, keep alive memory, and a data bus. As noted above, software with code for carrying out the methods according to the present disclosure may be stored on a machine-readable data carrier in the controller. Advantageously, a crane controller according to the present disclosure can be implemented by installing the software according to the present disclosure on a crane controller. The crane controller may receive various signals from sensors coupled to the crane and/or pontoon. In one example, the software may include various programs (including control and estimation routines, operating in real-time), such as heave compensation, as described herein. The specific routines described herein may represent one or more of any number of processing strategies such as event-driven, interrupt-driven, multi-tasking, multi-threading, and the like. Thus, the described methods may represent code to be programmed into the computer readable storage medium in the crane control system.

The heave compensation can comprise a measuring device which determines a current heave movement from sensor data. The measuring device can comprise sensors which are arranged at the crane foundation. In particular, this can be gyroscopes and/or tilt angle sensors. Particularly, three gyroscopes and three tilt angle sensors are provided.

Furthermore a prediction device can be provided, which predicts a future movement of the cable suspension point 2 with reference to the determined heave movement and a model of the heave movement. In particular, the prediction device solely predicts the vertical movement of the cable suspension point. In connection with the measuring and/or prediction device, a movement of the ship at the point of the sensors of the measuring device possibly can be converted into a movement of the cable suspension point.

The prediction device and the measuring device advantageously are configured such as is described in more detail in DE 10 2008 024513 A1.

Alternatively, the crane according to the present disclosure also might be a crane which is used for lifting and/or lowering a load from or to a load deposition point arranged on a pontoon, which therefore moves with the heave. In this case, the prediction device must predict the future movement of the load deposition point. This can be effected analogous to the procedure described above, wherein the sensors of the measuring device are arranged on the pontoon of the load deposition point. The crane for example can be a harbor crane, an offshore crane or a cable excavator.

In the exemplary embodiment, the hoisting winch of the hoisting gear 5 is driven hydraulically. In particular, a hydraulic circuit of hydraulic pump and hydraulic motor is provided, via which the hoisting winch is driven. A hydraulic accumulator can be provided, via which energy is stored on lowering the load, so that this energy is available when lifting the load.

Alternatively, an electric drive might be used. The same might also be connected with an energy accumulator.

In the following, an exemplary embodiment of the present disclosure will now be shown, in which a multitude of aspects of the present disclosure are jointly realized. The individual aspects can, however, also each be used separately for developing the embodiment of the present disclosure as described in the general part of the present application.

1 Planning of Reference Trajectories

For implementing the required predictive behavior of the active heave compensation, a sequential control consisting of a pilot control and a feedback in the form of a structure of two degrees of freedom is employed. The pilot control is calculated by a differential parametrization and requires reference trajectories steadily differentiable two times.

For planning it is decisive that the drive can follow the specified trajectories. Thus, constraints of the hoisting gear must also be taken into account. Starting point for the consideration are the vertical position and/or velocity of the cable suspension point $\tilde{z}_a^h$ and $\dot{z}_a^h$, which are predicted e.g. via the algorithm described in DE 10 2008 024 513 over a fixed time horizon. In addition, the hand lever signal of the crane operator, by which he moves the load in the inertial coordinate system, also is included in the trajectory planning.

For safety reasons it is necessary that the winch also can still be moved via the hand lever signal in the case of a failure of the active heave compensation. With the used concept for trajectory planning, a separation between the planning of the reference trajectories for the compensation movement and those as a result of a hand lever signal therefore is effected, as is shown in FIG. 1.

In the Figure, $y_a^*$, $\dot{y}_a^*$ and $\ddot{y}_a^*$ designate the position, velocity and acceleration planned for the compensation, and $y_l^*$, $\dot{y}_l^*$ and $\ddot{y}_l^*$ the position, velocity and acceleration for the superimposed unwinding or winding of the cable as planned on the basis of the hand lever signal. In the further course of the execution, planned reference trajectories for the movement of the hoisting winch always are designated with $y^*$, $\dot{y}^*$ and $\ddot{y}^*$, respectively, since they serve as reference for the system output of the drive dynamics.

Due to the separate trajectory planning it is possible to use the same trajectory planning and the same sequential controller with the heave compensation switched off or in the case of a complete failure of the heave compensation (e.g. due to failure of the IMU) for the hand lever control in manual operation and thereby generate an identical operating behavior with the heave compensation switched on.

Figure 1:
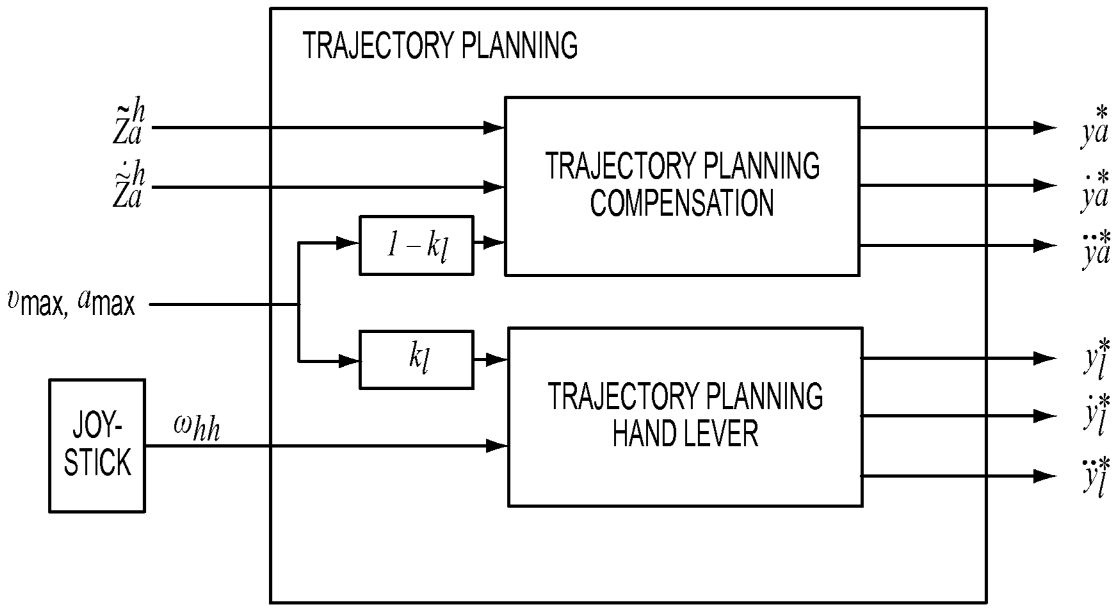
FIG. 1 shows the structure of a separate trajectory planning for the heave compensation and the operator control.

In order not to violate the given constraints in velocity $v_{max}$ and acceleration $a_{max}$ despite the completely independent planning, $v_{max}$ and $a_{max}$ are split up by a weighting factor $0 \leq k_l \leq 1$ (cf. FIG. 1). The same is specified by the crane operator and hence provides for individually splitting up the power which is available for the compensation and/or for moving the load. Thus, the maximum velocity and acceleration of the compensation movement are $(1-k_l)v_{max}$ and $(1-k_l)a_{max}$ and the trajectories for the superimposed unwinding and winding of the cable are $k_l v_{max}$ and $k_l a_{max}$.

A change of $k_l$ can be performed during operation. Since the maximum possible traveling speed and acceleration are dependent on the total mass of cable and load, $v_{max}$ and $a_{max}$ also can change in operation. Therefore, the respectively applicable values likewise are handed over to the trajectory planning.

By splitting up the power, the control variable constraints possibly are not utilized completely, but the crane operator can easily and intuitively adjust the influence of the active heave compensation.

A weighting of $k_l=1$ is equal to switching off the active heave compensation, whereby a smooth transition between a compensation switched on and switched off becomes possible.

The first part of the chapter initially explains the generation of the reference trajectories $y_a^*$, $\dot{y}_a^*$ and $\ddot{y}_a^*$ for compensating the vertical movement of the cable suspension point. The essential aspect here is that with the planned trajectories the vertical movement is compensated as far as is possible due to the given constraints set by $k_l$.

Therefore, by the vertical positions and velocities of the cable suspension point $\tilde{z}_a^h=[\tilde{z}_a^h(t_k+T_{p,1}) \ldots \tilde{z}_a^h(t_k+T_{p,K_p})]^T$ and $\dot{z}_a^h=[\dot{z}_a^h(t_k+T_{p,1}) \ldots \dot{z}_a^h(t_k+T_{p,K_p})]^T$ predicted over a complete time horizon, an optimal control problem therefore is formulated, which is solved cyclically, wherein $K_p$ designates the number of the predicted time steps. The associated numerical solution and implementation will be discussed subsequently.

The second part of the chapter deals with the planning of the trajectories $y_l^*$, $\dot{y}_l^*$ and $\ddot{y}_l^*$ for traveling the load. The same are generated directly from the hand lever signal of the crane operator $w_{hh}$. The calculation is effected by an addition of the maximum admissible jerk.

Reference Trajectories for the Compensation

In the trajectory planning for the compensation movement of the hoisting winch, sufficiently smooth trajectories must be generated from the predicted vertical positions and velocities of the cable suspension point taking into account the valid drive constraints. This task subsequently is regarded as constrained optimization problem, which can be solved online at each time step. Therefore, the approach resembles the draft of a model-predictive control, although in the sense of a model-predictive trajectory generation.

As references or setpoint values for the optimization the vertical positions and velocities of the cable suspension point $\tilde{z}_a^h=[\tilde{z}_a^h(t_k+T_{p,1}) \ldots \tilde{z}_a^h(t_k+T_{p,K_p})]^T$ and $\dot{z}_a^h=[\dot{z}_a^h(t_k+T_{p,1}) \ldots \dot{z}_a^h(t_k+T_{p,K_p})]^T$ are used, which are predicted at the time $t_k$ over a complete time horizon with $K_p$ time steps and are calculated with the corresponding prediction time, e.g. via the algorithm described in DE 10 2008 024 513.

Considering the constraints valid by $k_l$, $v_{max}$ and $a_{max}$ an optimum time sequence thereupon can be determined for the compensation movement.

However, analogous to the model-predictive control only the first value of the trajectory calculated thereby is used for the subsequent control. In the next time step, the optimization is repeated with an updated and therefore more accurate prediction of the vertical position and velocity of the cable suspension point.

The advantage of the model-predictive trajectory generation with successive control as compared to a classical model-predictive control on the one hand consists in that the control part and the related stabilization can be calculated with a higher scan time as compared to the trajectory generation. Therefore, the calculation-intensive optimization can be shifted into a slower task.

In this concept, on the other hand, an emergency function can be realized independent of the control for the case that the optimization does not find a valid solution. It consists of a simplified trajectory planning which the control relies upon in such emergency situation and further actuates the winch.

System Model for Planning the Compensation Movement

To satisfy the requirements of the steadiness of the reference trajectories for the compensation movement, its third derivative $\dddot{y}_a^*$ at the earliest can be regarded as jump-capable. However, jumps in the jerk should be avoided in the compensation movement with regard to the winch life, whereby only the fourth derivative $y_a^{(4)*}$ can be regarded as jump-capable.

Figure 2:
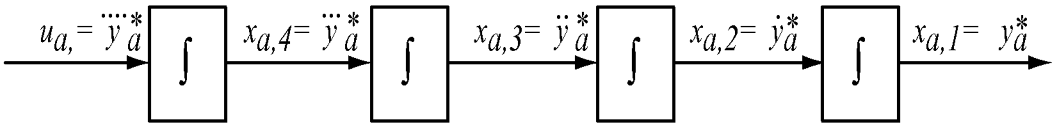
FIG. 2 shows a fourth order integrator chain for planning trajectories with steady jerk.

Thus, the jerk $\dddot{y}_a^*$ must at least be planned steady and the trajectory generation for the compensation movement is effected with reference to the fourth order integrator chain illustrated in FIG. 2. In the optimization, the same serves as system model and can be expressed as $$\dot{x}_a = \underbrace{\begin{bmatrix} 0 & 1 & 0 & 0 \\ 0 & 0 & 1 & 0 \\ 0 & 0 & 0 & 1 \\ 0 & 0 & 0 & 0 \end{bmatrix}}_{A_a} x_a + \underbrace{\begin{bmatrix} 0 \\ 0 \\ 0 \\ 1 \end{bmatrix}}_{B_a} u_a,\ x_a(0) = x_{a,0}, \tag{1.1}$$

$$y_a = x_a$$

in the state space. Here, the output $y_a=[y_a^*,\dot{y}_y^*,\ddot{y}_a^*,\dddot{y}_a^*]^T$ includes the planned trajectories for the compensation movement. For formulating the optimal control problem and with regard to the future implementation, this time-continuous model initially is discretized on the lattice $$\tau_0<\tau_1< \ldots <\tau_{K_p-1}<\tau_{K_p} \tag{1.2}$$

wherein $K_p$ represents the number of the prediction steps for the prediction of the vertical movement of the cable suspension point. To distinguish the discrete time representation in the trajectory generation from the discrete system time $t_k$, it is designated with $\tau_k=k\Delta\tau$, wherein $k=0, \ldots, K_p$ and $\Delta\tau$ is the discretization interval of the horizon $K_p$ used for the trajectory generation.

Figure 3:
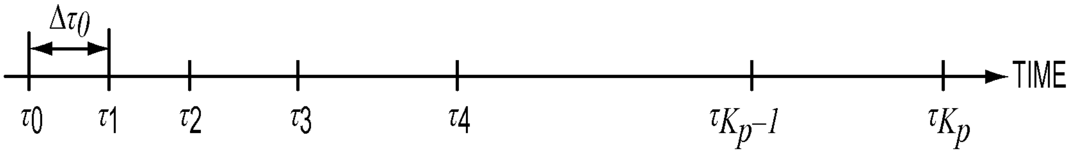
FIG. 3 shows a non-equidistant discretization for trajectory planning, which towards the end of the time horizon uses larger distances than at the beginning of the time horizon.

FIG. 3 illustrates that the chosen lattice is non-equidistant, so that the number of the necessary supporting points on the horizon is reduced. Thus, it is possible to keep the dimension of the optimal control problem to be solved small. The influence of the rougher discretization towards the end of the horizon has no disadvantageous effects on the planned trajectory, since the prediction of the vertical position and velocity is less accurate towards the end of the prediction horizon.

The time-discrete system representation valid for this lattice can be calculated exactly with reference to the analytical solution $$x_a(t) = e^{A_a t}x_a(0) + \int_0^t e^{A_a(t-\tau)}B_a u_a(\tau)d\tau \tag{1.3}$$

For the integrator chain from FIG. 2 it follows to $$x_a(\tau_{k+1}) = \begin{bmatrix} 1 & \Delta\tau_k & \frac{\Delta\tau_k^2}{2} & \frac{\Delta\tau_k^3}{6} \\ 0 & 1 & \Delta\tau_k & \frac{\Delta\tau_k^2}{2} \\ 0 & 0 & 1 & \Delta\tau_k \\ 0 & 0 & 0 & 1 \end{bmatrix} + \begin{bmatrix} \frac{\Delta\tau_k^4}{24} \\ \frac{\Delta\tau_k^3}{6} \\ \frac{\Delta\tau_k^2}{2} \\ \Delta\tau_k \end{bmatrix} u_a(\tau_k), \tag{1.4}$$

$$x_a(0) = x_{a,0},\ y_a(\tau_k) = x_a(\tau_k),\ k = 0, \ldots, K_p - 1,$$

wherein $\Delta\tau_k=\tau_{k+1}-\tau_k$ describes the discretization step width valid for the respective time step.

Formulation and Solution of the Optimal Control Problem

By solving the optimal control problem a trajectory will be planned, which as closely as possible follows the predicted vertical movement of the cable suspension point and at the same time satisfies the given constraints.

To satisfy this requirement, the merit function reads as follows:

$$J = \frac{1}{2}\sum_{k=1}^{K_p} \left\{ \begin{array}{c} [y_a(\tau_k) - w_a(\tau_k)]^T Q_w(\tau_k)[y_a(\tau_k) - w_a(\tau_k)] + \\ u_a(\tau_{k-1})r_u u_a(\tau_{k-1}) \end{array} \right\} \tag{1.5}$$

wherein $w_a(\tau_k)$ designates the reference valid at the respective time step. Since only the predicted position $\tilde{z}_a^h(t_k+T_{p,k})$ and velocity $\dot{\tilde{z}}_a^h(t_k+T_{p,k})$ of the cable suspension point are available here, the associated acceleration and the jerk are set to zero. The influence of this inconsistent specification, however, can be kept small by a corresponding weighting of the acceleration and jerk deviation. Thus:

$$w_a(\tau_k)=[\tilde{z}_a^h(t_k+T_{p,k})\dot{\tilde{z}}_a^h(t_k+T_{p,k})00]^T,\ k=1, \ldots, K_p. \tag{1.6}$$

Over the positively semidefinite diagonal matrix $$Q_w(\tau_k)=\mathrm{diag}(q_{w,1}(\tau_k),q_{w,2}(\tau_k),q_{w,3},q_{w,4}(\tau_k),\ k=1, \ldots, K_p \tag{1.7}$$

deviations from the reference are weighted in the merit function. The scalar factor $r_u$ evaluates the correction effort. While $r_u$, $q_{w,3}$ and $q_{w,4}$ are constant over the entire prediction horizon, $q_{w,1}$ and $q_{w,2}$ are chosen in dependence on the time step $\tau_k$. Reference values at the beginning of the prediction horizon therefore can be weighted more strongly than those at the end. Hence, the accuracy of the vertical movement prediction decreasing with increasing prediction time can be depicted in the merit function. Because of the non-existence of the references for the acceleration and the jerk, the weights $q_{w,3}$ and $q_{w,4}$ only punish deviations from zero, which is why they are chosen smaller than the weights for the position $q_{w,1}(\tau_k)$ and velocity $q_{w,2}(\tau_k)$.

The associated constraints for the optimal control problem follow from the available power of the drive and the currently chosen weighting factor $k_l$ (cf. FIG. 1). Accordingly, it applies for the states of the system model from (1.4):

$$-\delta_a(\tau_k)(1-k_1)v_{max}\leq x_{a,2}(\tau_k)\leq\delta_a(\tau_k)(1-k_1)v_{max},$$

$$-\delta_a(\tau_k)(1-k_l)a_{max}\leq x_{a,3}(\tau_k)\leq\delta_a(\tau_k)(1-k_l)a_{max},\ k=1, \ldots, K_p,$$

$$-\delta_a(\tau_k)j_{max}\leq x_{a,4}(\tau_k)\leq\delta_a(\tau_k)j_{max}, \tag{1.8}$$

and for the input:

$$-\delta_a(\tau_k)\frac{d}{dt}j_{max} \le u_a(\tau_k) \le \delta_a(\tau_k)\frac{d}{dt}j_{max}, \quad k = 0, \ldots , K_p - 1. \tag{1.9}$$

Here, $\delta_a(\tau_k)$ represents a reduction factor which is chosen such that the respective constraint at the end of the horizon amounts to 95% of that at the beginning of the horizon. For the intermediate time steps, $\delta_a(\tau_k)$ follows from a linear interpolation. The reduction of the constraints along the horizon increases the robustness of the method with respect to the existence of admissible solutions.

While the velocity and acceleration constraints can change in operation, the constraints of the jerk $j_{max}$ and the derivative of the jerk $$\frac{d}{dt}j_{max}$$

are constant. To increase the useful life of the hoisting winch and the entire crane, they are chosen with regard to a maximum admissible shock load. For the positional state no constraints are applicable.

Since the maximum velocity $v_{max}$ and acceleration $a_{max}$ as well as the weighting factor of the power $k_l$ in operation are determined externally, the velocity and acceleration constraints also are changed necessarily for the optimal control problem. The presented concept takes account of the related time-varying constraints as follows: As soon as a constraint is changed, the updated value first is taken into account only at the end of the prediction horizon for the time step $\tau_{K_p}$. With progressing time, it is then pushed to the beginning of the prediction horizon.

Figure 4:
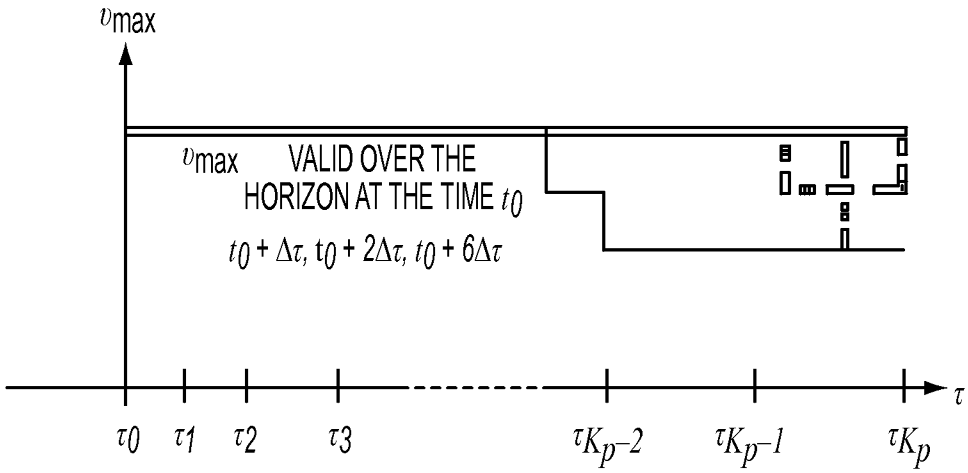
FIG. 4 shows how changing constraints first are taken into account at the end of the time horizon using the example of velocity.

FIG. 4 illustrates this procedure with reference to the velocity constraint. When reducing a constraint, care should be taken in addition that it fits with its maximum admissible derivative. This means that for example the velocity constraint $(1-k_l)v_{max}$, maximally can be reduced as fast as is allowed by the current acceleration constraint $(1-k_l)a_{max}$. Because the updated constraints are pushed through, there always exists a solution for an initial condition $x_a(\tau_0)$ present in the constraints, which in turn does not violate the updated constraints. However, it will take the complete prediction horizon, until a changed constraint finally influences the planned trajectories at the beginning of the horizon.

Thus, the optimal control problem is completely given by the quadratic merit function (1.5) to be minimized, the system model (1.4) and the inequality constraints from (1.8) and (1.9) in the form of a linear-quadratic optimization problem (QP problem for Quadratic Programming Problem). When the optimization is carried out for the first time, the initial condition is chosen to be $x_a(\tau_0)=[0,0,0,0]^T$. Subsequently, the value $x_a(\tau_1)$ calculated for the time step $\tau_1$ in the last optimization step is used as initial condition.

At each time step, the calculation of the actual solution of the QP problem is effected via a numerical method which is referred to as QP solver.

Due to the calculation effort for the optimization, the scan time for the trajectory planning of the compensation movement is greater than the discretization time of all remaining components of the active heave compensation; thus: $\Delta\tau > \Delta t$.

To ensure that the reference trajectories are available for the control at a faster rate, the simulation of the integrator chain from FIG. 2 takes place outside the optimization with the faster scan time $\Delta t$. As soon as new values are available from the optimization, the states $x_a(\tau_0)$ are used as initial condition for the simulation and the correcting variable at the beginning of the prediction horizon $u_a(\tau_0)$ is written on the integrator chain as constant input.

Reference Trajectories for Moving the Load

Analogous to the compensation movement, two times steadily differentiable reference trajectories are necessary for the superimposed hand lever control (cf. FIG. 1). As with these movements specifiable by the crane operator, no fast changes in direction normally are to be expected for the winch, the minimum requirement of a steadily planned acceleration $\ddot{y}_l^*$ also was found to be sufficient with respect to the useful life of the winch. Thus, in contrast to the reference trajectories planned for the compensation movement, the third derivative $\dddot{y}_l^*$, which corresponds to the jerk, already can be regarded as jump-capable.

Figure 5:
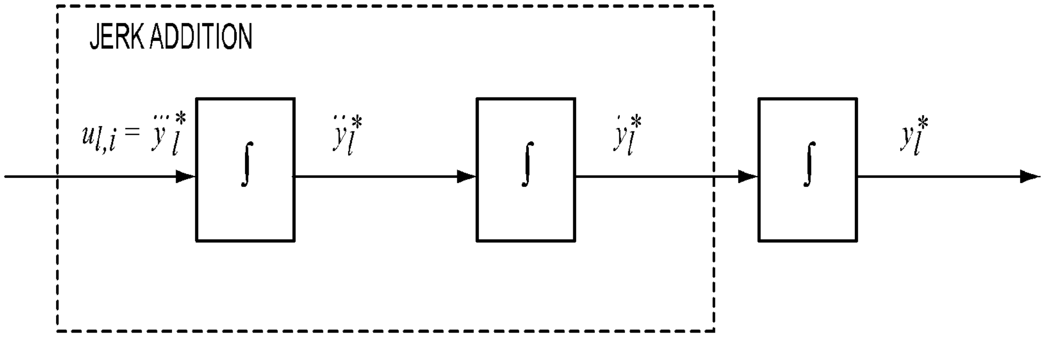
FIG. 5 shows the third order integrator chain used for the trajectory planning of the operator control, which works with reference to a jerk addition.

As shown in FIG. 5, it also serves as input of a third order integrator chain. Beside the requirements as to steadiness, the planned trajectories also must satisfy the currently valid velocity and acceleration constraints, which for the hand lever control are found to be $k_l v_{max}$ and $k_l a_{max}$.

Figure 6:
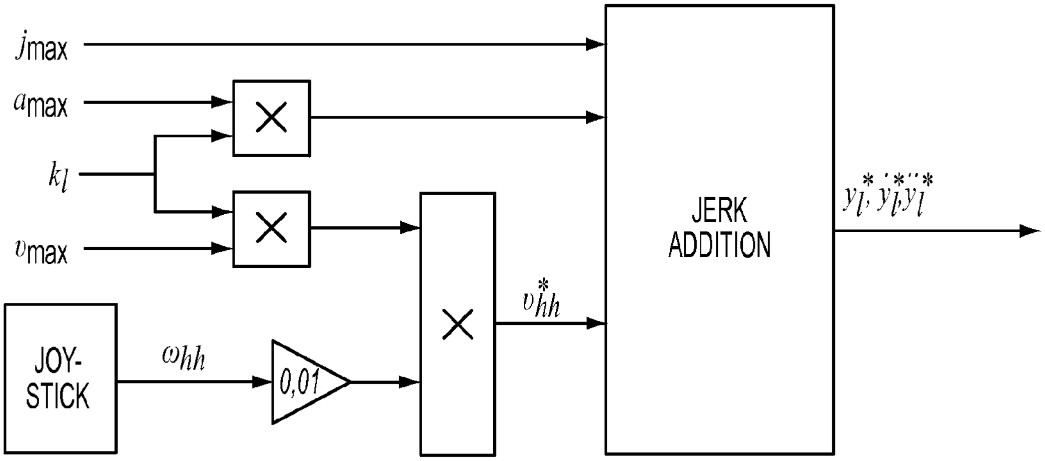
FIG. 6 shows the structure of the path planning of the operator control, which takes account of constraints of the drive.

The hand lever signal of the crane operator $-100 \le w_{hh} \le 100$ is interpreted as relative velocity specification with respect to the currently maximum admissible velocity $k_l v_{max}$. Thus, according to FIG. 6 the target velocity specified by the hand lever is $$v_{hh}^* = k_l v_{max}\frac{w_{hh}}{100}. \tag{1.10}$$

As can be seen, the target velocity currently specified by the hand lever depends on the hand lever position $w_{hh}$, the variable weighting factor $k_l$ and the current maximum admissible winch speed $v_{max}$.

The task of trajectory planning for the hand lever control now can be indicated as follows: From the target velocity specified by the hand lever, a steadily differentiable velocity profile can be generated, so that the acceleration has a steady course. As procedure for this task a so-called jerk addition is recommendable.

The basic idea is that in a first phase the maximum admissible jerk $j_{max}$ acts on the input of the integrator chain, until the maximum admissible acceleration is reached. In the second phase, the speed is increased with constant acceleration; and in the last phase the maximum admissible negative jerk is added such that the desired final speed is achieved.

Figure 7:
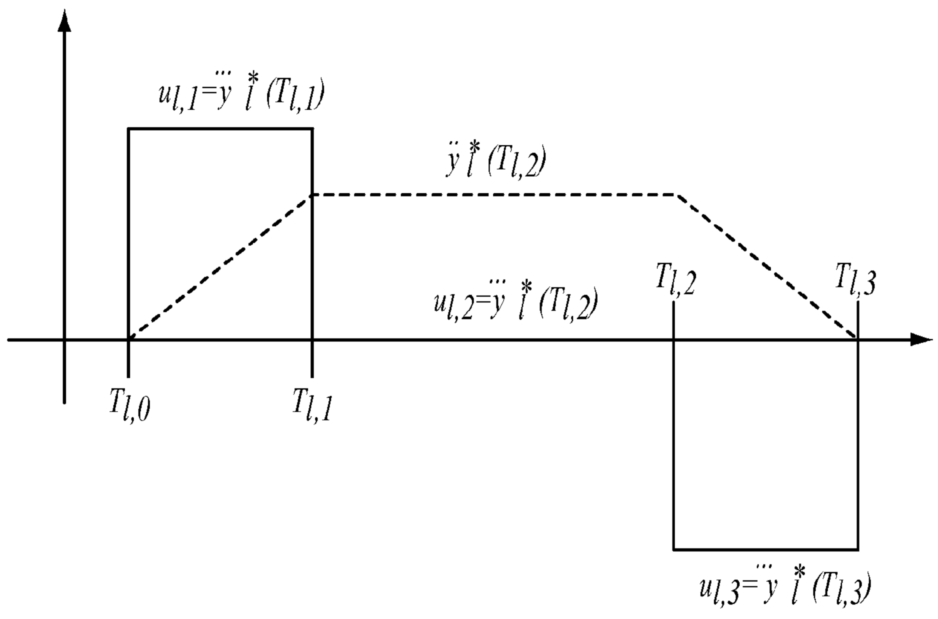
FIG. 7 shows an exemplary jerk profile with associated switching times, from which a trajectory for the position and/or velocity and/or acceleration of the hoisting gear is calculated with reference to the path planning.

Therefore, merely the switching times between the individual phases must be determined in the jerk addition. FIG. 7 shows an exemplary course of the jerk for a speed change together with the switching times. $T_{l,0}$ designates the time at which replanning takes place. The times $T_{l,1}$, $T_{l,2}$ and $T_{l,3}$ each refer to the calculated switching times between the individual phases. Their calculation is outlined in the following paragraph.

As soon as a new situation occurs for the hand lever control, replanning of the generated trajectories takes place. A new situation occurs as soon as the target velocity $v_{hh}^*$, or the currently valid maximum acceleration for the hand lever control $k_l a_{max}$ is changed. The target velocity can change due to a new hand lever position $w_{hh}$ or due to a new specification of $k_l$ or $v_{max}$ (cf. FIG. 6). Analogously, a variation of the maximum valid acceleration by $k_l$ or $a_{max}$ is possible.

When replanning the trajectories, that velocity initially is calculated from the currently planned velocity $\dot{y}_l^*(T_{l,0})$ and the corresponding acceleration $\ddot{y}_l^*(T_{l,0})$ which is obtained with a reduction of the acceleration to zero:

$$\tilde{v} = \dot{y}_l^*(T_{l,0}) + \Delta\tilde{T}_1\ddot{y}_l^*(T_{l,0}) + \frac{1}{2}\Delta\tilde{T}_1^2\tilde{u}_{l,1}, \tag{1.11}$$

wherein the minimum necessary time is given by $$\Delta\tilde{T}_1 = -\frac{\ddot{y}_l^*}{\tilde{u}_{l,1}},\ \tilde{u}_{l,1} \neq 0 \tag{1.12}$$

and $\tilde{u}_{l,1}$ designates the input of the integrator chain, i.e. the added jerk (cf. FIG. 5): In dependence on the currently planned acceleration $\ddot{y}_l^*(T_{l,0})$ it is found to be $$\tilde{u}_{l,1} = \begin{cases} j_{max}, & \text{for } \ddot{y}_l^* < 0 \\ -j_{max}, & \text{for } \ddot{y}_l^* > 0 \\ 0, & \text{for } \ddot{y}_l^* = 0. \end{cases} \tag{1.13}$$

In dependence on the theoretically calculated velocity and the desired target velocity, the course of the input now can be indicated. If $v_{hh}^* > \tilde{v}$, $\tilde{v}$ does not reach the desired value $v_{hh}^*$ and the acceleration can be increased further. However, if $v_{hh}^* < \tilde{v}$, $\tilde{v}$ is too fast and the acceleration must be reduced immediately.

From these considerations, the following switching sequences of the jerk can be derived for the three phases:

$$u_l = \begin{cases} [\,j_{max} \quad 0 \quad -j_{max}\,], & \text{for } \tilde{v} \le v_{hh}^* \\ [\,-j_{max} \quad 0 \quad j_{max}\,], & \text{for } \tilde{v} > v_{hh}^* \end{cases} \tag{1.14}$$

with $u_l = [u_{l,1}, u_{l,2}, u_{l,3}]$ and the input signal $u_{l,i}$ added in the respective phase. The duration of a phase is found to be $\Delta T_i = T_{l,i} - T_{l,i-1}$ with i=1, 2, 3. Accordingly, the planned velocity and acceleration at the end of the first phase are:

$$\dot{y}_l^*(T_{l,1}) = \dot{y}_1^*(T_{l,0}) + \Delta T_1\ddot{y}_l^*(T_{l,0}) + \frac{1}{2}\Delta T_1^2 u_{l,1}, \tag{1.15}$$

$$\ddot{y}_l^*(T_{l,1}) = \ddot{y}_l^*(T_{l,0}) + \Delta T_1 u_{l,1} \tag{1.16}$$

and after the second phase:

$$\dot{y}_l^*(T_{l,2}) = \dot{y}_l^*(T_{l,1}) + \Delta T_2\ddot{y}_l^*(T_{l,1}) \tag{1.17}$$

$$\ddot{y}_l^*(T_{l,2}) = \ddot{y}_l^*(T_{l,1}), \tag{1.18}$$

wherein $u_{l,2}$ was assumed=0. After the third phase, finally, it follows:

$$\dot{y}_l^*(T_{l,3}) = \dot{y}_l^*(T_{l,2}) + \Delta T_3\ddot{y}_l^*(T_{l,2}) + \frac{1}{2}\Delta T_3^2 u_{l,3}, \tag{1.19}$$

$$\ddot{y}_l^*(T_{l,3}) = \ddot{y}_l^*(T_{l,2}) + \Delta T_3 u_{l,3}. \tag{1.20}$$

For the exact calculation of the switching times $T_{l,i}$ the acceleration constraint initially is neglected, whereby $\Delta T_2 = 0$. Due to this simplification, the lengths of the two remaining time intervals can be indicated as follows:

$$\Delta T_1 = \frac{\tilde{a} - \ddot{y}_l^*(T_{l,0})}{u_{l,1}}, \tag{1.21}$$

$$\Delta T_3 = \frac{0 - \tilde{a}}{u_{l,3}}, \tag{1.22}$$

wherein $\tilde{a}$ stands for the maximum acceleration achieved. By inserting (1.21) and (1.22) into (1.15), (1.16) and (1.19) a system of equations is obtained, which can be resolved for $\tilde{a}$. Considering $\dot{y}_l^*(T_{l,3}) = v_{hh}^*$, the following finally is obtained:

$$\tilde{a} = \pm\sqrt{\frac{u_{l,3}[2\dot{y}_l^*(T_{l,0})u_{l,1} - \ddot{y}_l^*(T_{l,0})^2 - 2v_{hh}^* u_{l,1}]}{u_{l,1} - u_{l,3}}}. \tag{1.23}$$

The sign of $\tilde{a}$ follows from the condition that $\Delta T_1$ and $\Delta T_3$ in (1.21) and (1.22) must be positive.

In a second step, $\tilde{a}$ and the maximum admissible acceleration $k_l a_{max}$ result in the actual maximum acceleration:

$$\bar{a} = \ddot{y}_l^*(T_{l,1}) = \ddot{y}_l^*(T_{l,2}) = \min\{k_l a_{max}, \max\{-k_l a_{max}, \tilde{a}\}\} \tag{1.24}$$

With the same, the really occurring time intervals $\Delta T_1$ and $\Delta T_3$ finally can be calculated. They result from (1.21) and (1.22) with $\tilde{a} = \bar{a}$. The yet unknown time interval $\Delta T_2$ now is determined from (1.17) and (1.19) with $\Delta T_1$ and $\Delta T_3$ from (1.21) and (1.22) to be $$\Delta T_2 = \frac{2v_{hh}^* u_{l,3} + \bar{a}^2 - 2\dot{y}_l^*(T_{l,1})u_{l,3}}{2\bar{a}u_{l,3}}, \tag{1.25}$$

wherein $\dot{y}_l^*(T_{l,1})$ follows from (1.15). The switching times can directly be taken from the time intervals:

$$T_{l,i} = T_{l,i-1} + \Delta T_i,\ i = 1,2,3. \tag{1.26}$$

The velocity and acceleration profiles $\dot{y}_l^*$ and $\ddot{y}_l^*$ to be planned can be calculated analytically with the individual switching times. It should be mentioned that the trajectories planned by the switching times frequently are not traversed completely, since before reaching the switching time $T_{l,3}$ a new situation occurs, replanning thereby takes place and new switching times must be calculated. As mentioned already, a new situation occurs by a change in $w_{hh}$, $v_{max}$, $a_{max}$ or $k_l$.

Figure 8:
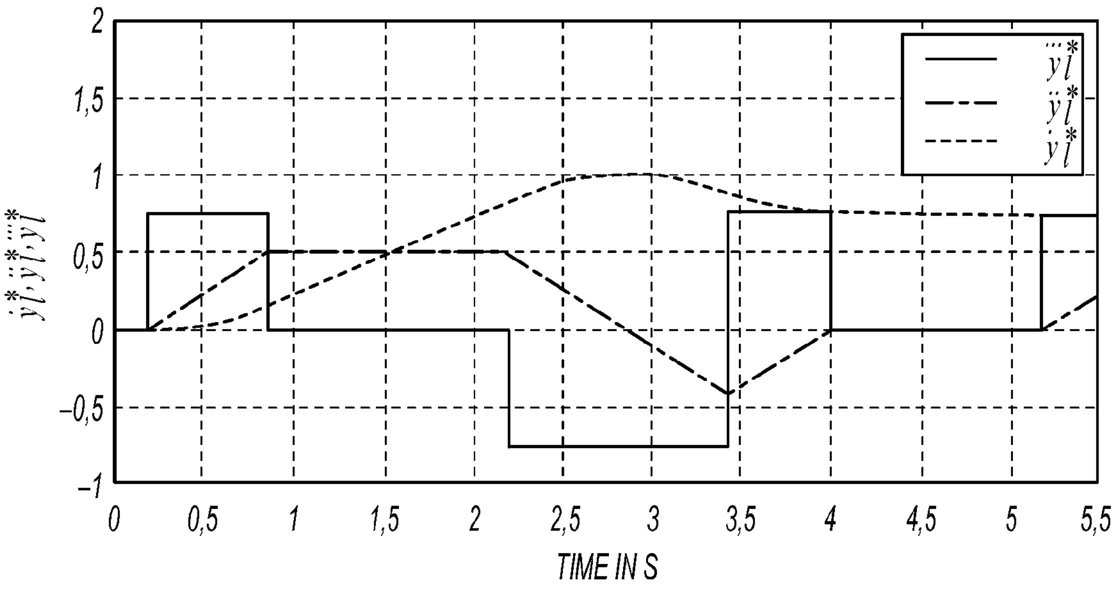
FIG. 8 shows a course of a velocity and acceleration trajectory generated with the jerk addition.

FIG. 8 shows a trajectory generated by the presented method by way of example. The course of the trajectories includes both cases which can occur due to (1.24). In the first case, the maximum admissible acceleration is reached at the time t=1 s, followed by a phase with constant acceleration. The second case occurs at the time t=3.5 s. Here, the maximum admissible acceleration is not reached completely due to the hand lever position. The consequence is that the first and the second switching time coincide, and $\Delta T_2 = 0$ applies. According to FIG. 5, the associated position course is calculated by integration of the velocity curve, wherein the position at system start is initialized by the cable length currently unwound from the hoisting winch.

Actuation Concept for the Hoisting Winch

Figure 9:
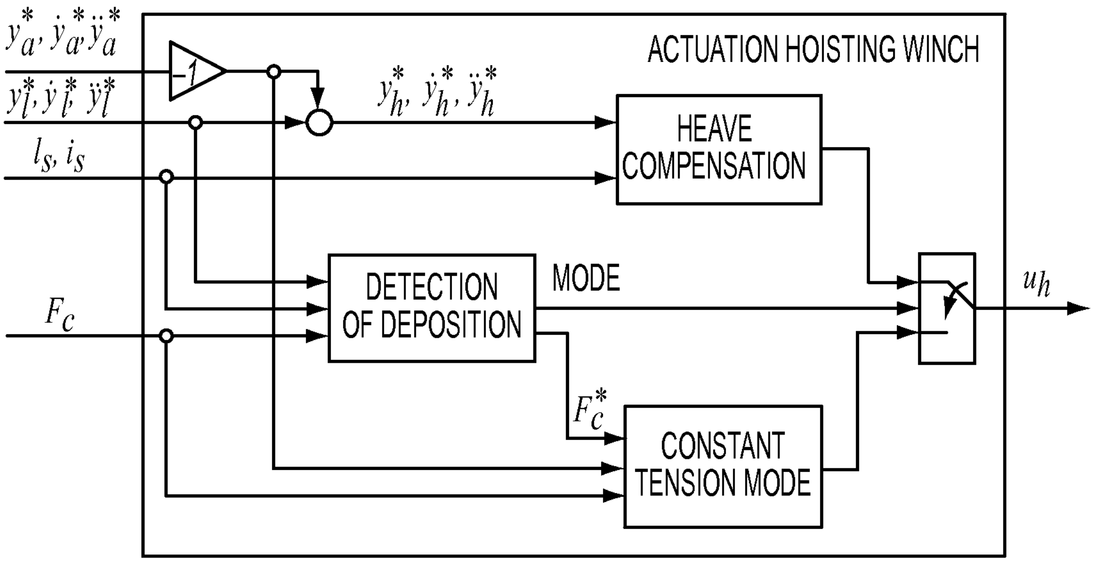
FIG. 9 shows an overview of the actuation concept with an active heave compensation and a target force mode, here referred to as constant tension mode.

In principle, the actuation consists of two different operating modes: the active heave compensation for decoupling the vertical load movement from the ship movement with free-hanging load and the constant tension control for avoiding a slack cable, as soon as the load is deposited on the sea bed. During a deep-sea lift, the heave compensation initially is active. With reference to a detection of the depositing operation, switching to the constant tension control is effected automatically. FIG. 9 illustrates the overall concept with the associated reference and control variables.

Each of the two different operating modes however might also be implemented each without the other operating mode. Furthermore, a constant tension mode as it will be described below can also be used independent of the use of the crane on a ship and independent of an active heave compensation.

Due to the active heave compensation, the hoisting winch should be actuated such that the winch movement compensates the vertical movement of the cable suspension point $z_a^h$ and the crane operator moves the load by the hand lever in the h coordinate system regarded as inertial. To ensure that the actuation has the required predictive behavior for minimizing the compensation error, it is implemented by a pilot control and stabilization part in the form of a structure of two degrees of freedom. The pilot control is calculated from a differential parametrization by the flat output of the winch dynamics and results from the planned trajectories for moving the load $y_l^*$, $\dot{y}_l^*$ and $\ddot{y}_l^*$ as well as the negative trajectories for the compensation movement $-y_a^*$, $-\dot{y}_a^*$ and $-\ddot{y}_a^*$ (cf. FIG. 9). The resulting target trajectories for the system output of the drive dynamics and the winch dynamics are designated with $y_h^*$, $\dot{y}_h^*$ and $\ddot{y}_h^*$. They represent the target position, velocity and acceleration for the winch movement and thereby for the winding and unwinding of the cable.

During the constant tension phase, the cable force at the load $F_{sl}$ is to be controlled to a constant amount, in order to avoid a slack cable. The hand lever therefore is deactivated in this operating mode, and the trajectories planned on the basis of the hand lever signal no longer are added. The actuation of the winch in turn is effected by a structure of two degrees of freedom with pilot control and stabilization part.

The exact load position $z_l$ and the cable force at the load $F_{sl}$ are not available as measured quantities for the control, since due to the long cable lengths and great depths the crane hook is not equipped with a sensor unit. Furthermore, no information exists on the kind and shape of the suspended load. Therefore, the individual load-specific parameters such as load mass $m_l$, coefficient of the hydrodynamic increase in mass $C_a$, coefficient of resistance $C_d$ and immersed volume $\nabla_l$, are not known in general, whereby a reliable estimation of the load position is almost impossible in practice.

Thus, merely the unwound cable length $l_s$, and the associated velocity $\dot{l}_s$ as well as the force at the cable suspension point $F_c$ are available as measured quantities for the control. The length $l_s$, is obtained indirectly from the winch angle $\phi_h$ measured with an incremental encoder and the winch radius $r_h(j_l)$ dependent on the winding layer $j_l$. The associated cable velocity $\dot{l}_s$ can be calculated by numerical differentiation with suitable low-pass filtering. The cable force $F_c$ applied to the cable suspension point is detected by a force measuring pin.

Actuation for the Active Heave Compensation

Figure 10:
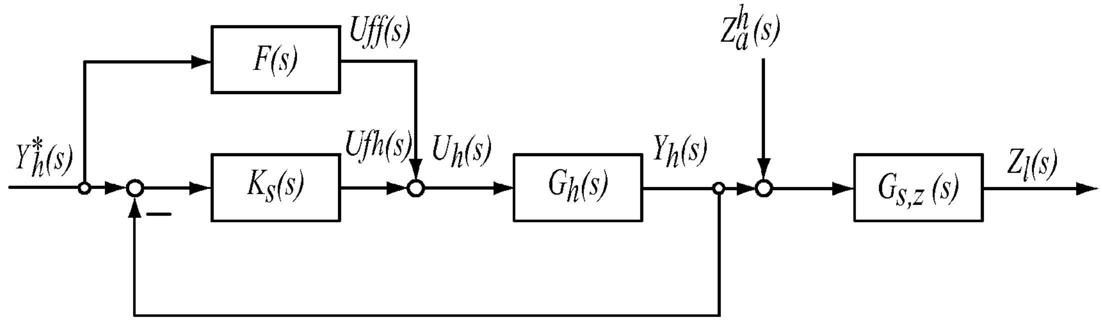
FIG. 10 shows a block circuit diagram of the actuation for the active heave compensation.

FIG. 10 illustrates the actuation of the hoisting winch for the active heave compensation with a block circuit diagram in the frequency range. As can be seen, there is only effected a feedback of the cable length and velocity $y_h=l_s$ and $\dot{y}_h=\dot{l}_s$ from the partial system of the drive $G_h(s)$. As a result, the compensation of the vertical movement of the cable suspension point $Z_a^h(s)$ acting on the cable system $G_{s,z}(s)$ as input interference takes place purely as pilot control; cable and load dynamics are neglected. Due to a non-complete compensation of the input interference or a winch movement, the inherent cable dynamics is incited, but in practice it can be assumed that the resulting load movement is greatly attenuated in water and decays very fast.

The transfer function of the drive system from the correcting variable $U_h(s)$ to the unwound cable length $Y_h(s)$ can be approximated as $IT_1$ system and results in $$G_h(s) = \frac{Y_h(s)}{U_h(s)} = \frac{K_h r_h(j_l)}{T_h s^2 + s} \tag{2.1}$$

with the winch radius $r_h(j_l)$. Since the system output $Y_h(s)$ at the same time represents a flat output, the inverting pilot control F(s) will be $$F(s) = \frac{U_{ff}(s)}{Y_h^*(s)} = \frac{1}{G_h(s)} = \frac{T_h}{K_h r_h(j_l)} s^2 + \frac{1}{K_h r_h(j_l)} s \tag{2.2}$$

and can be written in the time domain in the form of a differential parametrization as $$u_{ff}(t) = \frac{T_h}{K_h r_h(j_l)} \ddot{y}_h^*(t) + \frac{1}{K_h r_h(j_l)} \dot{y}_h^*(t) \tag{2.3}$$

(2.3) shows that the reference trajectory for the pilot control must be steadily differentiable at least two times.

The transfer function of the closed circuit, consisting of the stabilization $K_a(s)$ and the winch system $G_h(s)$, can be taken from FIG. 10 to be $$G_{AHC}(s) = \frac{K_a(s) G_h(s)}{1 + K_a(s) G_h(s)} \tag{2.4}$$

By neglecting the compensation movement $Y_a^*(s)$, the reference variable $Y_h^*(s)$ can be approximated as ramp-shaped signal with a constant or stationary hand lever deflection, as in such a case a constant target velocity $v_{h,h}^*$ exists. To avoid a stationary control deviation in such reference variable, the open chain $K_a(s)G_h(s)$ therefore must show a $I_2$ behavior [9]. This can be achieved for example by a PID controller with $$K_a(s) = \frac{T_h}{K_h r_h(j_l)} \left( \frac{\kappa_{AHC,0}}{s} + \kappa_{AHC,1} + \kappa_{AHC,2} s \right), \quad \kappa_{AHC,i} > 0 \tag{2.5}$$

Hence it follows for the closed circuit:

$$G_{AHC}(s) = \frac{\kappa_{AHC,0} + \kappa_{AHC,1} s + \kappa_{AHC,2} s^2}{s^3 + \left( \frac{1}{T_h} + \kappa_{AHC,2} \right) s^2 + \kappa_{AHC,1} s + \kappa_{AHC,0}}, \tag{2.6}$$

wherein the exact values of $\kappa_{AHC,i}$ are chosen in dependence on the respective time constant $T_h$.

Detection of the Depositing Operation

As soon as the load hits the sea bed, switching from the active heave compensation into the constant tension control should be effected. For this purpose, a detection of the depositing operation is necessary (cf. FIG. 9). For the same and the subsequent constant tension control, the cable is approximated as simple spring-mass element. Thus, the force acting at the cable suspension point approximately is calculated as follows $$F_c = k_c \Delta l_c, \tag{2.7}$$

wherein $k_c$ and $\Delta l_c$ designate the spring constant equivalent to the elasticity of the cable and the deflection of the spring. For the latter, it applies:

$$\Delta l_c = \int_0^1 \varepsilon_s(\bar{s}, t)d\bar{s} = \bar{z}_{s,stat}(1) - \bar{z}_{s,stat}(0) - t_s = \frac{gl_s}{E_sA_s}\left(m_e + \frac{1}{2}\mu_s l_s\right). \quad (2.8)$$

The equivalent spring constant $k_c$ can be determined from the following stationary observation. For a spring loaded with the mass $m_f$ it applies in the stationary case:

$$k_c\Delta l_c = m_f g. \quad (2.9)$$

A transformation of (2.8) results in $$\frac{E_sA_s}{l_s}\Delta l_c = \left(m_c + \frac{1}{2}\mu_s l_s\right)g. \quad (2.10)$$

With reference to a coefficient comparison between (2.9) and (2.10) the equivalent spring constant can be read as $$k_c = \frac{E_sA_s}{l_s} \quad (2.11)$$

In (2.9) it can also be seen that the deflection of the spring $\Delta l_c$ in the stationary case is influenced by the effective load mass $m_e$ and half the cable mass $\frac{1}{2}\mu_s l_s$. This is due to the fact that in a spring the suspended mass $m_f$ is assumed to be concentrated in one point. The cable mass, however, is uniformly distributed along the cable length and therefore does not fully load the spring. Nevertheless, the full weight force of the cable $\mu_s l_s g$ is included in the force measurement at the cable suspension point.

With this approximation of the cable system, conditions for the detection of the depositing operation on the sea bed now can be derived. At rest, the force acting on the cable suspension point is composed of the weight force of the unwound cable $\mu_s l_s g$ and the effective weight force of the load mass $m_e g$. Therefore, the measured force $F_c$ with a load located on the sea bed approximately is $$F_c = (m_c + \mu_s l_s)g + \Delta F_c \quad (2.12)$$

with $$\Delta F_c = -k_c\Delta l_s, \quad (2.13)$$

wherein $\Delta l_s$ designates the cable unwound after reaching the sea bed. From (2.13) it follows that $\Delta l_s$ is proportional to the change of the measured force, since the load position is constant after reaching the ground. With reference to (2.12) and (2.13) the following conditions now can be derived for a detection, which must be satisfied at the same time:

The decrease of the negative spring force must be smaller than a threshold value:

$$\Delta F_c < \Delta\hat{F}_c. \quad (2.14)$$

The time derivative of the spring force must be smaller than a threshold value:

$$\dot{F}_c < \hat{\dot{F}}_c, \quad (2.15)$$

The crane operator must lower the load. This condition is checked with reference to the trajectory planned with the hand lever signal:

$$\dot{y}_l^* \geq 0. \quad (2.16)$$

To avoid a wrong detection on immersion into the water, a minimum cable length must be unwound:

$$l_s > l_{s,min}. \quad (2.17)$$

The decrease of the negative spring force $\Delta F_c$ each is calculated with respect to the last high point $\overline{F}_c$ in the measured force signal $F_c$. To suppress measurement noise and high-frequency interferences, the force signal is preprocessed by a corresponding low-pass filter.

Since the conditions (2.14) and (2.15) must be satisfied at the same time, a wrong detection as a result of a dynamic inherent cable oscillation is excluded: As a result of the dynamic inherent cable oscillation, the force signal $F_c$ oscillates, whereby the change of the spring force $\Delta F_c$ with respect to the last high point $\overline{F}_c$ and the time derivative of the spring force $\dot{F}_c$ have a shifted phase. Consequently, with a suitable choice of the threshold values $\Delta\hat{F}_c$ and $\hat{\dot{F}}_c$ in the case of a dynamic inherent cable oscillation, both conditions cannot be satisfied at the same time. For this purpose, the static part of the cable force must drop, as is the case on immersion into the water or on deposition on the sea bed. A wrong detection on immersion into the water, however, is prevented by condition (2.17).

The threshold value for the change of the spring force is calculated in dependence on the last high point in the measured force signal as follows:

$$\Delta\hat{F}_c = \min\{-\chi_1\overline{F}_c, \Delta\hat{F}_{c,max}\}, \quad (2.18)$$

wherein $\chi_1 < 1$ and the maximum value $\Delta\hat{F}_{c,max}$ were determined experimentally. The threshold value for the derivative of the force signal $\hat{\dot{F}}_c$ can be estimated from the time derivative of (2.7) and the maximum admissible hand lever velocity $k_l v_{max}$ as follows $$\hat{\dot{F}}_c = \min\{-\chi_2 k_c k_l v_{max}, \hat{\dot{F}}_{c,max}\} \quad (2.19)$$

The two parameters $\chi_2 < 1$ and $\hat{\dot{F}}_{c,max}$ likewise were determined experimentally.

Since in the constant tension control a force control is applied instead of the position control, a target force $F_c^*$ is specified as reference variable in dependence on the sum of all static forces $F_{l,stat}$ acting on the load. For this purpose $F_{l,stat}$ is calculated in the phase of the heave compensation in consideration of the known cable mass $\mu_s l_s$:

$$F_{l,stat} = F_{c,stat} - \mu_s l_s g. \quad (2.20)$$

$F_{c,stat}$ designates the static force component of the measured force at the cable suspension point $F_c$. It originates from a corresponding low-pass filtering of the measured force signal. The group delay obtained on filtering is no problem, as merely the static force component is of interest and a time delay has no significant influence thereon. From the sum of all static forces acting on the load, the target force is derived taking into account the weight force of the cable additionally acting on the cable suspension point, as follows:

$$F_c^s = p_s F_{l,stat} + \mu_s l_s g, \quad (2.21)$$

wherein the resulting tension in the cable is specified by the crane operator with $0 < p_s < 1$. To avoid a setpoint jump in the reference variable, a ramp-shaped transition from the force currently measured on detection to the actual target force $F_c^*$ is effected after a detection of the depositing operation.

For picking up the load from the sea bed, the crane operator manually performs the change from the constant tension mode into the active heave compensation with free-hanging load.

Actuation for the Constant Tension Mode

Figure 11:
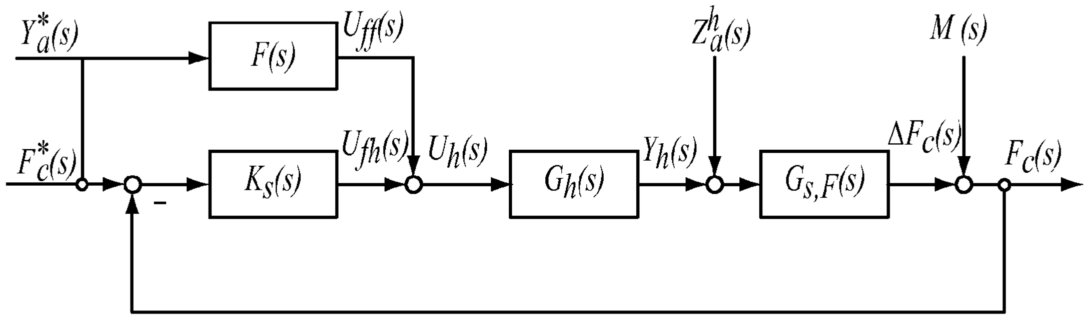
FIG. 11 shows a block circuit diagram of the actuation for the target force mode.

FIG. 11 shows the implemented actuation of the hoisting winch in the constant tension mode in a block circuit diagram in the frequency range. In contrast to the control structure illustrated in FIG. 10, the output of the cable system $F_c(s)$, i.e. the force measured at the cable suspension point, here is fed back instead of the output of the winch system $Y_h(s)$. According to (2.12), the measured force $F_c(s)$ is composed of the change in force $\Delta F_c(s)$ and the static weight force $m_e g+\mu_s l_s g$ which in the Figure is designated with M(s). For the actual control, the cable system in turn is approximated as spring-mass system.

The pilot control F(s) of the structure of two degrees of freedom is identical with the one for the active heave compensation and given by (2.2) and (2.3), respectively. In the constant tension mode, however, the hand lever signal is not added, which is why the reference trajectory only consists of the negative target velocity and acceleration $-\dot{y}_a^*$ and $-\ddot{y}_a^*$ for the compensation movement. The pilot control part initially in turn compensates the vertical movement of the cable suspension point $Z_a^h(s)$. However, a direct stabilization of the winch position is not effected by a feedback of $Y_h(s)$. This is effected indirectly by the feedback of the measured force signal.

The measured output $F_c(s)$ is obtained from FIG. 11 as follows $$F_c(s) = G_{CT,1}(s)\underbrace{[Y_a^*(s)F(s)G_h(s) + Z_a^h(s)]}_{E_a(s)} + G_{CT,2}(s)F_c^*(s) \tag{2.22}$$

with the two transfer functions $$G_{CT,1}(s) = \frac{G_{s,F}(s)}{1 + K_s(s)G_h(s)G_{s,F}(s)}, \tag{2.23}$$

$$G_{CT,2}(s) = \frac{K_s(s)G_h(s)G_{s,F}(s)}{1 + K_s(s)G_h(s)G_{s,F}(s)}, \tag{2.24}$$

wherein the transfer function of the cable system for a load standing on the ground follows from (2.12):

$$G_{s,F}(s) = -k_c, \tag{2.25}$$

As can be taken from (2.22), the compensation error $E_a(s)$ is corrected by a stable transfer function $G_{CT,1}(s)$ and the winch position is stabilized indirectly. In this case, too, the requirement of the controller $K_s(s)$ results from the expected reference signal $F_c^*(s)$, which after a transition phase is given by the constant target force $F_c^*$ from (2.21). To avoid a stationary control deviation with such constant reference variable, the open chain $K_s(s)G_h(s)G_{s,F}(s)$ must have an I behavior. Since the transfer function of the winch $G_h(s)$ already implicitly has such behavior, this requirement can be realized with a P feedback; thus, it applies:

$$K_s(s) = -\frac{T_h}{K_h r_h(j_l)}\kappa_{CT},\ \kappa_{CT} > 0. \tag{2.26}$$

The invention claimed is:

1. A crane controller for a crane which includes a hoisting gear for lifting a load hanging on a cable, the crane controller comprising instructions to operate the crane in a cable force mode in which the crane controller actuates the hoisting gear such that a setpoint of the cable force is obtained, in which a pilot control part of the crane controller takes account of dynamics of the cable, and in which a feedback part of the crane controller feeds back a cable force determined by a cable force determination unit of the crane controller wherein in the cable force mode, the cable force is controlled by feedback of at least one measured value, wherein the controller further comprises instructions to determine, at the cable force determination unit, an actual value of the cable force on the basis of a measurement signal of a cable force sensor, the cable force sensor arranged at the hoisting gear, wherein the controller further comprises a setpoint determination unit and instructions to determine, at the setpoint determination unit, the setpoint of the cable force with reference to measured values and/or control signals and/or inputs of a user, and wherein the controller further comprises instructions to determine, at the cable force determination unit, a static force acting on the cable during a lift.

2. The crane controller according to claim 1, wherein the controller further comprises instructions for obtaining the setpoint of the cable force by controlling a velocity and/or position of a winch of the hoisting gear based on an elasticity of the crane.

3. The crane controller according to claim 2, wherein the controller further comprises instructions for maintaining the cable force at a constant setpoint in the cable force mode, and wherein the actuation of the hoisting gear is effected on the basis of a comparison of the actual value of the cable force and the setpoint value of the cable force.

4. The crane controller according to claim 1, wherein the controller further comprises instructions to determine the actual value of the cable force with the cable force determination unit via a filtration of measured values or a model-based estimation.

5. The crane controller according to claim 1, wherein a cable length is included in a target force determination unit of the controller, and wherein the target force determination unit takes account of a weight of an unwound cable.

6. The crane controller according to claim 1, wherein the crane controller comprises an input element via which a crane operator varies the setpoint of the cable force, wherein a factor entered by the crane operator via the input element determines a ratio between the setpoint of the cable force and the static force during a lift.

7. The crane controller according to claim 1, further comprising a state detection, wherein the crane controller automatically switches into and/or out of the cable force mode with reference to the state detection, and wherein the controller further comprises instructions to detect, at the state detection, setting down and/or picking up of the load.

8. The crane controller according to claim 1, further comprising instructions to operate in a lifting mode in which the hoisting gear is actuated on the basis of a setpoint of a load state and cable state.

9. The crane controller according to claim 1, further comprising an active heave compensation, the active heave compensation including instructions to at least partly compensate a movement of a cable suspension point and/or a load deposition point via actuation of the hoisting gear due to the heave.

10. The crane controller of claim 1, wherein the crane is one or more of a deck crane, harbor crane, offshore crane, cable excavator, and a mobile harbor crane.

11. A method for actuating a crane which includes a hoisting gear for lifting a load hanging on a cable, comprising:

operating the crane in a cable force mode, including actuating the hoisting gear based on a setpoint of a cable force, wherein during operation in the cable force mode, a pilot control part of a crane controller takes account of dynamics of the cable, and a feedback part of the crane controller feeds back a cable force determined by a cable force determination unit of the crane controller wherein in the cable force mode, the cable force is controlled by feedback of at least one measured value, wherein the controller further comprises instructions to determine, at the cable force determination unit, an actual value of the cable force on the basis of a measurement signal of a cable force sensor, the cable force sensor arranged at the hoisting gear, wherein the controller further comprises a setpoint determination unit and instructions to determine, at the setpoint determination unit, the setpoint of the cable force with reference to measured values and/or control signals and/or inputs of a user, and wherein the controller further comprises instructions to determine, at the cable force determination unit, a static force acting on the cable during a lift.

12. The method of claim 11, wherein a winch of the hoisting gear is adjusted based on an elasticity of the crane while operating in the cable force mode to achieve the setpoint cable force.

13. The method of claim 12, wherein in the cable force mode, the cable force is maintained at a constant setpoint, wherein the actuation of the hoisting gear is effected on the basis of a comparison of the actual value of the cable force and the setpoint value of the cable force.

* * * * *